United States Patent [19]
Kawai

[11] 3,793,822
[45] Feb. 26, 1974

[54] FISHING NET
[75] Inventor: Shoji Kawai, Tokyo, Japan
[73] Assignee: Momoi Fishing Net Manufacturing Co., Ltd., Hyogo-ken, Japan
[22] Filed: July 14, 1971
[21] Appl. No.: 162,441

[52] U.S. Cl. ................ 57/140 BY, 43/7, 87/12
[51] Int. Cl. .... A01k 71/00, A01k 73/00, D02g 3/04
[58] Field of Search ........ 87/12; 57/140 BY, 140 R; 264/103; 43/7, 9–12, 14; 161/DIG. 6

[56] References Cited
UNITED STATES PATENTS

| | | | |
|---|---|---|---|
| 3,329,061 | 7/1967 | Momoi | 87/12 |
| 3,507,109 | 4/1970 | Nakazawa | 57/140 R |
| 3,015,150 | 1/1962 | Fior | 87/12 X |
| 2,590,586 | 3/1952 | Thompson, Jr. et al. | 87/12 X |
| 2,792,617 | 5/1957 | Haller | 87/12 |
| 2,870,669 | 1/1959 | Kopacki | 87/12 X |
| 2,919,467 | 1/1960 | Mercer | 264/103 |
| 3,630,117 | 12/1971 | Guy | 87/12 |
| 3,632,714 | 1/1972 | Fairbanks | 264/103 |

*Primary Examiner*—John Petrakes
*Attorney, Agent, or Firm*—Kemon, Palmer & Estabrook

[57] ABSTRACT

A fishing net formed of monofilaments 200 to 2,000 deniers thick which are prepared mainly from polyamide resin blended with polypropylene and, if desired, at least one selected from the group consisting of polyester resin, polyvinyl chloride and polyvinylidene chloride.

10 Claims, 1 Drawing Figure

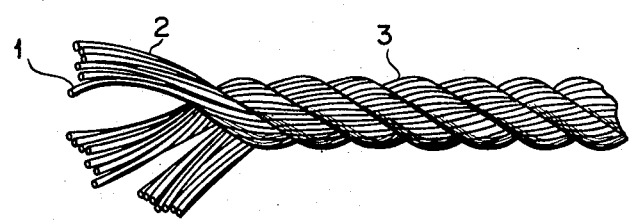

FISHING NET

BACKGROUND OF THE INVENTION

This invention relates to a fishing net suitable as a purse seine, trawl net or trap net. In most of the prior art fishing nets, a proper number of multifilaments of polyamide resin are twisted into strands which are in turn formed into cords. These cords are further so arranged as to fabricate netting. There is known another type of fishing net which is formed by twisting monofilaments of polyamide resin directly into cords and arranging said cords into netting.

In any case, the prior art netting thus formed had to be subjected to a variety of post treatments, such as, heat treatment, coloring and resin coating so as to improve hygroscopicity, water repellency, sinking speed, frictional resistance and mechanical rigidity. While such post treatments can indeed improve the quality of netting, to some extent, the resulting effect is only temporary, so that similar post treatments must be repeated every several fishery operations.

In recent years, the operation of a purse seine and trawl net has become more mechanized. As a result, a violent frictional force resulting from the use of a net lifting apparatus is applied to the net, so that such a fishing net as resistible to the aforesaid friction has been needed. Further, it is essential that the trap net has a large specific gravity and a proper extent of stiffness, in order to provide the net with suitable net shaping and sweeping by current in water. In these respects, the prior art fishing net is not satisfactory.

SUMMARY OF THE INVENTION

This invention has been achieved in view of the aforementioned circumstances and accordingly it is an object of the invention to provide a fishing net which has various improved properties in respect of, for example, water absorption, water repellency, sinking speed, and resistivity to frictions resulting from mechanical or other harsh handlings. A further object of this invention is to provide a fishing net which is free from scaling off of its color.

Monofilaments used in the fishing net according to this invention are formed of a mixture of a major component of polyamide resin, a proper amount of polypropylene and, if necessary, at least one selected from the group consisting of polyester resin, polyvinyl chloride and polyvinylidene chloride.

The words "fishing net" used herein is intended to particularly mean a purse seine, trawl net or trap net.

BRIEF DESCRIPTION OF THE DRAWING

The single FIGURE is an enlarged, broken view showing groups of monofilaments as twisted into strands of a cord according to the invention.

DETAILED DESCRIPTION OF THE INVENTION

It has been found by the inventor that twisted monofilaments exhibit greatly improved extrusion and elongation when they are formed of material obtained by incorporating in polyamide resin a proper amount of polypropylene. It is believed that the improvements in extrusion and elongation are owing to the fact that polypropylene having a better elongation ratio than polyamide resin is interposed between the molecules of the resin without forming chemical bonding therewith.

Examples of polyamide resin used in the invention include 6 nylon and 6.6 nylon.

The dispersion into polyamide resin of a colorant is generally poor. It has been found, as a further advantage, that a colorant is excellently dispersed into a mixture of polyamide resin and polypropylene according to this invention. For example, a colored chip of polypropylene may be used to obtain well dispersed excellent coloration. Further, the use of polypropylene makes it possible to spin monofilaments from a mixture with polyamide resin of such material, for example, polyester resin, polyvinyl chloride and polyvinylidene chloride, as are known to have difficulties in forming a mixture with polyamide resin. In other words, a proper amount of polyester resin, such as, polyethylene terephthalate and a copolymer thereof, polyvinyl chloride, polyvinylidene chloride or the like each having a greater specific gravity than polyamide resin can be selectively used to give a fishing net various properties not attained heretofore, such as a good sinking speed and a good spread in the operated state.

In prior art multifilaments of polyamide resin type, the production per run of the filaments is forced to be great due to the nature of manufacturing equipments used and arrangements therefor, with the result that coloring of the raw material is practically next to impossible. Such coloring can be made in the production of a monofilament, as in this invention, since a spinning nozzle can be easily replaced. In the polyamide multifilament, the filament used is fine. For example, a strand of 210 deniers generally consists of 24 filaments of 9 deniers. A fishing net formed of strands of the above nature has a weak friction resistance and can not maintain its rigidity unless it is additionally surface treated by tar base resin. Such resin, however, tends to fall off after several times of operation.

A monofilament used in the invention is colored when it is spun, so that decoloration of the net due to use can be avoided. The use of polypropylene as part of the raw material serves to increase the frictional resistance of the net so that the net is not damaged after several times of use as in the prior art.

A monofilament is producible in the range of 15 and 4,000 deniers. When monofilaments are twisted into a strand, the thicker is each monofilament, the greater the frictional resistance becomes. However, the entire structure of the strands or a cord formed becomes hard, which causes twisting and net-arranging operation to be carried out with increasing difficulty. Further, such filaments may make a fishing net too hard, and cause some trouble in the finish and handling of the net material. For this reason, the monofilament according to this invention should preferably fall within the range of 200 and 2,000 deniers. The monofilament below that range is not preferred because of its insufficient resistance to friction. The monofilament whose thickness is above the above-said range will cause the fishing net to have an excellent frictional resistance, but is not preferred from the standpoint of twisting and net-forming processes since the stiffness of the net is undesirably increased. When monofilaments are formed into a fishing net without being twisted, a filament of 1,000 to 10,000 deniers should preferably be selected.

The proportion of polypropylene to be introduced into polyamide resin ranges from 1 to 10 weight percent, preferably from 2 to 5 weight percent. Similarly, the proportion of polyester resin or polyvinyl chloride is preferably below 40 weight percent. In case it is above 40 weight percent, a difficulty arises in manufacturing the monofilament and simultaneously the strength thereof is decreased. Further, the proportion of polyvinylidene chloride is preferably below 30 weight percent. In case it is more than 30 weight percent, a difficulty arises in manufacturing the monofilament as described above and simultaneously there can not be obtained such a filament having sufficient strength.

EXAMPLE 1

A cord constituting a fishing net according to the invention, e.g., a cord 3 obtained by twisting three strands 2 each of which is constructed of a plurality of monofilaments 1 as shown in the drawing was compared with a cord consisting of the prior art polyamide resin multifilaments in respect of frictional resistance. The result is shown in Table 1.

In Table 1, with respect to the frictional resistance, there is shown the number of times friction was purposely applied between the cord and iron until a cord or net material breaks in water by applying a load of 1.0kg to the cord and a load of 3.0kg to the net material (two meshes having three knots).

black monofilaments. The monofilaments thus obtained have no possibility that the coloring matter will fall off by any kind of frictions, in contrast to the prior art multifilaments coated of tar base resin thereon.

What is claimed is:

1. A fishing net made of a plurality of cords formed of monofilaments 200 to 2,000 deniers thick, said monofilaments being prepared mainly from polyamide resin blended with 1 to 10 weight percent of polypropylene based on the monofilaments.

2. The fishing net according to claim 1 wherein said monofilament contains at least one plastic resin selected from the group consisting of polyester resin, polyvinyl chloride and polyvinylidene chloride.

3. The fishing net according to claim 2 wherein said polyester resin is employed in an amount of less than 40 weight percent based on the monofilaments.

4. The fishing net according to claim 2 wherein said polyvinyl chloride is employed in an amount of less than 40 weight percent based on the monofilaments.

5. The fishing net according to claim 2 wherein said polyvinylidene chloride is employed in an amount of less than 30 weight percent based on the monofilaments.

6. The fishing net according to claim 1 wherein said monofilament contains a colorant.

TABLE 1

| Number | Sample | Filament | Strand | Cord | Friction strength Cord | Net material |
|---|---|---|---|---|---|---|
| 1 | Multifilament 6 nylon 100% | 9$^d$×24 | 17 | 3 | 1,340 | 2,806 |
| 2 | Monofilament 6 nylon 98% polypropylnee | 440$^d$ | 9 | 3 | 2,749 | 18,215 |
| 3 | Monofilament same as above | 1260$^d$ | 3 | 3 | 3,819 | 22,672 |
| 4 | Monofilament 6.6 nylon 60%, polyethylene terephthalate 36%, polypropylene | 440$^d$ | 9 | 3 | 2,250 | 10,560 |
| 5 | Monofilament 6 nylon 60%, polyvinyl chloride 38%, polypropylene 2% | 440$^d$ | 9 | 3 | 2,120 | 9,863 |
| 6 | Monofilament 6 nylon 70%, polyvinylidene 25%, polypropylene 5% | 440$^d$ | 9 | 3 | 1,940 | 8,266 |

Note.—$d$ represents the denier of filaments.

In the above Table 1, sample No. 1 represents the prior art multifilament and samples Nos. 2 to 6 represent monofilaments according to the present invention. As will be apparent from Table 1, a fishing net constructed of monofilaments according to the invention has an increased friction strength, semipermanently maintains proper hardness, i.e., mechanical strength, has good water repellency as compared with the prior art multifilament, quickly sinks on account of decreased resistance to water flow and has good net shape in water.

For illustration, raw material of monofilament could be easily colored by the following process.

A colored chip of polypropylene (PPM No. 327), black, Tokyo Ink K.K., Japan; an amount of carbon black added, 25 weight percent) of 2 weight parts was supplied to an extruder together with 6 nylon of 98 weight parts and the mixture was extruded to obtain 7. The fishing net according to claim 6 wherein said colorant is carbon black.

8. The fishing net of claim 1 wherein said monofilaments contain 2 to 5 percent by weight polypropylene resin.

9. The fishing net of claim 1 wherein said monofilaments consist essentially of a blend of about 2 percent by weight polypropylene resin and about 98 percent by weight polyamide resin.

10. A fishing net made of a plurality of cords formed of monofilaments consisting essentially of a blend of at least 60 percent by weight polyamide resin, 1–10 percent by weight polypropylene resin, any remainder being a thermoplastic resin selected from the group consisting of polyester resin, polyvinyl chloride resin and polyvinylidene chloride resin.

* * * * *